United States Patent
Doser et al.

(10) Patent No.: US 9,654,751 B2
(45) Date of Patent: May 16, 2017

(54) METHOD, APPARATUS AND SYSTEM FOR PROVIDING COLOR GRADING FOR DISPLAYS

(75) Inventors: Ingo Tobias Doser, Burbank, CA (US); Xueming Henry Gu, Calabasas, CA (US); Pierre Jean Ollivier, Paris (FR); Michael Allan Sterling, Westlake Village, CA (US); Bongsun Lee, La Crescenta, CA (US); Rainer Zwing, Villingen-Schwenningen (DE); Carlos Correa, Villingen-Schwenningen (DE); Jurgen Stauder, Montreuilille (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 1097 days.

(21) Appl. No.: 12/448,394

(22) PCT Filed: Dec. 21, 2006

(86) PCT No.: PCT/US2006/049072
§ 371 (c)(1),
(2), (4) Date: Jun. 21, 2010

(87) PCT Pub. No.: WO2008/085150
PCT Pub. Date: Jul. 17, 2008

(65) Prior Publication Data
US 2010/0265264 A1    Oct. 21, 2010

(51) Int. Cl.
*G09G 5/02*    (2006.01)
*H04N 9/67*    (2006.01)
(Continued)

(52) U.S. Cl.
CPC ............... *H04N 9/67* (2013.01); *G09G 5/02* (2013.01); *H04N 1/6052* (2013.01);
(Continued)

(58) Field of Classification Search
CPC .... H04N 1/6058; G09G 5/02; G09G 2340/06; G09G 2320/0666; G09G 5/346
(Continued)

(56) References Cited

U.S. PATENT DOCUMENTS 6,021,256 A * 2/2000 Ng et al. .................... 358/1.9
6,148,005 A   11/2000 Paul et al.
(Continued)

FOREIGN PATENT DOCUMENTS

EP    1478181    11/2004
EP    1845704    10/2007
(Continued)

OTHER PUBLICATIONS

Hitachi, Ltd. et al., "High-Definition Multimedia Interface Specification Version 1.3," Jun. 22, 2006, XP002391813.
(Continued)

*Primary Examiner* — Abderrahim Merouan
(74) *Attorney, Agent, or Firm* — Brian J. Dorini; Lily Neff

(57) ABSTRACT

A method, apparatus and system for providing color grading or color correction for displays includes a plurality of virtual device models where each virtual device model has a virtual model specification (VMS) which controls a display feature. Each display includes a display specification including a display requirement or requirements. An apparatus of the present invention is configured to compare the display feature of at least one VMS against the display requirement of the display specification to determine a best match therebetween to select a virtual device model to control a display picture. Color correction is further provided in post production using the VMS to provide consistency across multiple display types.

18 Claims, 11 Drawing Sheets

(51) Int. Cl.
   *H04N 1/60* (2006.01)
   *G09G 5/34* (2006.01)
(52) U.S. Cl.
   CPC .......... *H04N 1/6088* (2013.01); *G09G 5/346* (2013.01); *G09G 2320/0626* (2013.01); *G09G 2320/0666* (2013.01); *G09G 2320/0673* (2013.01); *G09G 2320/0693* (2013.01); *G09G 2340/06* (2013.01); *H04N 1/6058* (2013.01)
(58) Field of Classification Search
   USPC ... 345/173, 94, 100, 33, 103, 590, 690, 581; 382/232, 248, 190, 118; 715/804, 854, 715/203, 340
   See application file for complete search history.

(56) References Cited

U.S. PATENT DOCUMENTS

| | | | |
|---|---|---|---|
| 6,765,585 B2* | 7/2004 | Wada | G09G 1/285 345/589 |
| 6,771,323 B1 | 8/2004 | Dean et al. | |
| 7,006,760 B1* | 2/2006 | Takagi et al. | 386/329 |
| 7,613,727 B2 | 11/2009 | Visharam et al. | |
| 7,639,882 B2* | 12/2009 | Itakura | 382/232 |
| 7,978,763 B2 | 7/2011 | Inata et al. | |
| 8,050,326 B2 | 11/2011 | Yoon et al. | |
| 2001/0038746 A1* | 11/2001 | Hughes et al. | 386/123 |
| 2002/0024952 A1 | 2/2002 | Negishi et al. | |
| 2002/0118380 A1* | 8/2002 | Krueger et al. | 358/1.9 |
| 2002/0157112 A1 | 10/2002 | Kuhn et al. | |
| 2002/0180734 A1 | 12/2002 | Endoh et al. | |
| 2003/0031171 A1* | 2/2003 | Van Wageningen et al. | 370/360 |
| 2003/0037125 A1* | 2/2003 | Luman et al. | 709/220 |
| 2003/0125873 A1* | 7/2003 | Yamaguchi et al. | 701/211 |
| 2003/0142110 A1* | 7/2003 | Murashita | 345/600 |
| 2004/0004959 A1 | 1/2004 | Itakura et al. | |
| 2004/0008688 A1* | 1/2004 | Matsubara et al. | 370/395.21 |
| 2005/0134801 A1* | 6/2005 | Bogdanowicz et al. | 352/38 |
| 2005/0141008 A1* | 6/2005 | Billow et al. | 358/1.13 |
| 2005/0244070 A1* | 11/2005 | Itakura | 382/248 |
| 2006/0008150 A1* | 1/2006 | Zhao et al. | 382/190 |
| 2006/0083434 A1* | 4/2006 | Inata et al. | 382/232 |
| 2006/0114999 A1 | 6/2006 | Han et al. | |
| 2006/0119870 A1* | 6/2006 | Ho | H04N 1/6058 358/1.9 |
| 2006/0167987 A1 | 7/2006 | Yamane | |
| 2006/0222344 A1 | 10/2006 | Ukai et al. | |
| 2006/0238648 A1* | 10/2006 | Wogsberg | 348/441 |
| 2007/0053667 A1 | 3/2007 | Sunakawa | |
| 2007/0139405 A1* | 6/2007 | Marcinkiewicz | G09G 3/2003 345/207 |
| 2007/0139449 A1* | 6/2007 | Bergquist | G09G 3/3413 345/691 |
| 2007/0245391 A1 | 10/2007 | Pont et al. | |
| 2008/0144713 A1 | 6/2008 | Kimmich et al. | |
| 2009/0238264 A1 | 9/2009 | Wittig et al. | |
| 2009/0284554 A1* | 11/2009 | Doser | G09G 5/02 345/690 |
| 2010/0265264 A1 | 10/2010 | Doser et al. | |
| 2010/0272185 A1 | 10/2010 | Gao et al. | |
| 2010/0302271 A1* | 12/2010 | Sloan | 345/590 |
| 2011/0154426 A1 | 6/2011 | Doser et al. | |

FOREIGN PATENT DOCUMENTS

| | | |
|---|---|---|
| JP | 522656 | 1/1993 |
| JP | 573020 | 3/1993 |
| JP | 2001148794 | 5/2001 |
| JP | 2002149153 | 5/2002 |
| JP | 2002262120 | 9/2002 |
| JP | 2003308277 | 10/2003 |
| JP | 2004086249 | 3/2004 |
| JP | 2004112169 | 4/2004 |
| JP | 2004170822 | 6/2004 |
| JP | 2004260362 | 9/2004 |
| JP | 2005080153 | 3/2005 |
| JP | 2005524128 | 8/2005 |
| JP | 2005287069 | 10/2005 |
| JP | 2006033253 | 2/2006 |
| JP | 2006115244 | 4/2006 |
| JP | 2006155178 | 6/2006 |
| JP | 2006287364 | 10/2006 |
| JP | 2006295601 | 10/2006 |
| JP | 2007287364 | 10/2006 |
| JP | 2007089132 | 4/2007 |
| WO | WO0115129 | 3/2001 |
| WO | WO0143077 | 6/2001 |
| WO | WO0178007 | 10/2001 |
| WO | WO02097584 | 12/2002 |
| WO | WO03073768 | 9/2003 |
| WO | WO03073770 | 9/2003 |
| WO | WO 2007078563 | 7/2007 |

OTHER PUBLICATIONS

International Search Report, dated Apr. 18, 2008.
Bourgoin, "Windows Color System: Evolution in the Microsoft Coloro Management Ecosystem", Windows Digital Document Platforms & Solutions Group, 2005.
Specification ICC. 1:2004-10, Image Technology Colour Management-Architecture, Profile Format, and Data Structure, International Color Consortium, May 22, 2006.
White Paper, "Windows Color System: The Next Generation Color Management System", Microsoft Windows, Sep. 2005.
"Using Bitstream Structure Descriptions for the Exploitation of Multi-layered Temporal Scalability in H.264/AVCs Base Specification", Proceedings of the 8th International Workshop on Visual Content Processing and Representation, p. 122-130, Springer, Sep. 2003.

* cited by examiner

| VMS / Weight | VMS01 W01 | VMS02 W02 | VMS03 W03 | VMS04 W04 | VMS05 W05 | VMS06 W06 | VMS07 W07 | VMS08 W08 | VMS09 W09 | VMS10 W10 | VMS11 W11 | VMS12 W12 | SCORE |
|---|---|---|---|---|---|---|---|---|---|---|---|---|---|
| VM01 | Score 0101 | Score 0102 | Score 0103 | Score 0104 | Score 0105 | Score 0106 | Score 0107 | Score 0108 | Score 0109 | Score 0110 | Score 0111 | Score 0112 | Score VM01 |
| VM02 | Score 0201 | Score 0202 | Score 0203 | Score 0204 | Score 0205 | Score 0206 | Score 0207 | Score 0208 | Score 0209 | Score 0210 | Score 0211 | Score 0212 | Score VM02 |
| VM03 | Score 0301 | Score 0302 | Score 0303 | Score 0304 | Score 0305 | Score 0306 | Score 0307 | Score 0308 | Score 0309 | Score 0310 | Score 0311 | Score 0312 | Score VM03 |
| VM04 | Score 0401 | Score 0402 | Score 0403 | Score 0404 | Score 0405 | Score 0406 | Score 0407 | Score 0408 | Score 0409 | Score 0410 | Score 0411 | Score 0412 | Score VM04 |
| VM05 | Score 0501 | Score 0502 | Score 0503 | Score 0504 | Score 0505 | Score 0506 | Score 0507 | Score 0508 | Score 0509 | Score 0510 | Score 0511 | Score 0512 | Score VM05 |

FIG. 8

METHOD, APPARATUS AND SYSTEM FOR PROVIDING COLOR GRADING FOR DISPLAYS

This application claims the benefit, under 35 U.S.C. §365 of International Application PCT/US2006/049072 filed Dec. 21, 2006, which was published in accordance with PCT Article 21(2) on Jul. 17, 2008 in English.

TECHNICAL FIELD

The present invention generally relates to display adjustment and correction, and more particularly, to a method, apparatus and system for providing color grading adaptable to a multiplicity of different display types.

BACKGROUND OF THE INVENTION

Virtual device models known in the art (e.g., ITU-R Bt.709) and recommended viewing practices known in the art (e.g., SMPTE RP166) are well suited for viewing as provided by a cathode ray tube (CRT) device, which has traditionally been the most common consumer display device. However, these virtual models and viewing practices cannot satisfy all of the multiplicity of viewing devices and viewing situations available in today's market. Current products have a wide range of features that can vary from, for example, very bright displays with dim surround, to front projection displays with dark surround.

Imagery for home video viewing is color corrected typically using studio monitors which are known to be highly accurate, calibrated CRT monitors. Although an excellent display device, in reality, the CRT has less and less in common with the display devices actually used in homes of consumers. Newer display devices used in the home differ in display brightness, color gamut, contrast ratio, spatial and temporal behavior, etc. This is further complicated given that individual display technologies are diverging among themselves by new advances in backlight technology, power management and the like.

In addition, there is a completely new type of home viewing environment emerging with screens of around 100" in size and more. These new displays have completely new requirements for the color grading process in a home video framework. In some instances, the requirements may be closer to digital cinema requirements than they are to traditional Direct View CRT based home video.

At this moment, there is no technology that offers a satisfactory solution to the multiple facets of consumer display viewing. Currently, colors are decided based on a studio monitor which is assumed to behave according to the virtual device models (e.g., ITU-R Bt.709, SMPTE 240M and the like). In a Quality Control (QC) step, a few consumer type displays may be connected to detect potential problems, however, no solution covering a broader range of consumer displays and viewing situations is currently available.

The consumer marketplace now offers the buyer a choice of several display technologies. In order to illustrate the differences between technologies, an abbreviated collection of the technologies is reviewed herein. It is to be understood that other technologies exist and may include even greater differences.

Plasma technology offers a deep black and a high peak brightness. Plasma suffers from a dependency of peak brightness with white spot size, a so-called "APL" (average picture level) dependency. In many cases, as a consequence, the picture contrast is modified with the average picture level. Furthermore, it is a display technology which, at least at the current moment, features only a limited number of discrete picture levels. A considerable amount of dithering is applied in order to overcome this weakness. This is why spatial resolution may decrease with very low picture brightness. Spatial resolution from medium to high brightness is usually good. Every brand has its own set of phosphors, which in turn determines the color gamut of the set. Plasma screens offer a good screen size for cost ratio for non-projection and non-rear projection devices.

LCD technology is currently a more expensive solution in terms of size for the price. Current implementations with a CCFL (Cold Cathode Fluorescent Light) backlight offer a high brightness for all average picture levels. On the down side of this technology, there is a limited transparency for the on state and insufficient opaqueness for the off state. Some companies therefore implement a dynamic backlight in their latest products. This is very likely to become a common practice in time. The effect is that the dynamic backlight uses the backlight as a secondary modulator for light output of the display. As an effect, a dark scene becomes even darker and bright scenes become brighter, again depending on the "average picture level". One notable exception is a methodology which proposes a spatial modulation of the backlight by means of LED's.

Furthermore, LCD displays currently exhibit a significant variation in color gamut. This is caused by a momentary transition from low gamut backlights to a variety of new, high color gamut backlights. At the current time, a majority of LCD displays on the market exhibit non-standard color gamut.

CRT displays have traditionally been different in terms of color temperature and dynamic range. Depending on the manufacturer's preference, the color temperature for white varies from 6500K to more than 10000K. This applies for all other displays as well. The dynamic range is determined by the calibration of the CRT, to show or to not show sub-black (e.g., the level of blackness). Average brightness dependencies are also an issue, the higher the spot size, the darker the picture.

Front projection technology has emerged as an interesting alternative for home theatre. It is potentially possible to show the dynamic range and the color gamut of digital cinema projection, and the viewing condition is basically similar to the one used for digital cinema. However, different display technologies are also used for front projection systems and therefore different results can be expected from different devices.

These display technologies may have very different attributes. In some aspects, these technologies even oppose each other. One exemplary attribute is the average picture level dependency which is basically opposite between Plasma technology and the latest LCD displays. Another exemplary attribute may be the spatial resolution versus brightness on CRT versus Plasma.

The purpose of color correction is to predict what the consumers are going to see and to change the colors in a way to achieve the original artistic intent on the output medium. Knowing that the output medium (i.e., the display used for color correction) used to produce the color correction may have little in common with the output displays in the field, this becomes a difficult, perhaps unsuccessful, or at least an inefficient approach.

Asking the display manufacturers to build displays that better resemble the display currently used for color correction is not an option. This would result in the picture quality suffering because, in general, at least one property of the reference device would be impossible to achieve. In addition, many displays would have to "down grade" to the standard display specification which may have been defined at an earlier time without regard to improved technological advances that occur during the interim time.

SUMMARY OF THE INVENTION

The various embodiments of the present invention addresses these and other deficiencies of the prior art by providing a method, apparatus and system for providing color grading or color correction for a multiplicity of displays.

Embodiments of the present invention include emulating one or more device models on several professional displays for proof viewing, with the possibility of alerting a colorist of a problem in need of correction in one or several models. In this way, the colorist can remain focused on one or several virtual device models that need to be made consistent with each other. The color correcting process can be performed for primary main stream displays and for secondary display classes or particular conditions to create a plurality of virtual device models.

In one embodiment of the present invention, one individual color grading is used for each individual display technology and viewing situation. Each technology and viewing system can be made available for delivery using known transmission methods to the consumer for their display technology and viewing situation. Special display and viewing situations for, for example, airplane viewing and the like, are also incorporated.

In one embodiment, several versions of one movie feature are made, color corrected for individual virtual device models, and made available for consumer viewing. Perceived consistency is achieved by a diversification in the content production process in combination with a calibration process in the display, permitting differences between different device models while remaining consistent among devices belonging to one device model.

A selection process is performed on the display side where virtual device model specifications and actual device specification are matched, and the appropriate virtual device model is chosen so that the best picture data is selected. The selection process can be controlled by employing a look up table or matrix. The selection process can further be optimized or adjusted by assigning weights to the individual virtual device model specification parameters according to their importance. Predictability can be enhanced by standardizing the virtual device model specifications with the assigned weights. In one embodiment, a special application provides that, in the content creation stage, the virtual device model specification is replaced by actual device parameters of one or several specific actual display devices that are available at the consumer end. This can be done instead or in addition to color correcting for virtual device models.

A system, apparatus and method for adjusting display picture are disclosed. A plurality of virtual device models is included where each virtual device model has a virtual model specification (VMS) which controls a display feature. A display includes a display specification including a display requirement or requirements. A picture selector is configured to compare the display feature of at least one VMS against the display requirement of the display specification to determine a best match therebetween to select a virtual device models to control a display picture. Color correction is provided in post production using the VMS to provide consistency across multiple display types.

A method for adjusting a display picture includes receiving virtual device models, comparing the virtual device models to display requirements for a particular display to select a best virtual device model based on a score, and rendering a display picture in accordance with the best virtual device model. A method for color correction includes representing a display or a class of displays on which content is to be displayed by generating at least one virtual device model for color correction, adjusting the at least one virtual device model for color correction for the display or the class of displays by emulating representative displays for proof viewing of one of a display effect and a color decision and storing the virtual device models in accordance with the display effect or color decision.

In other embodiments, a display unit includes a display including a display specification including at least one display requirement. A picture selector is configured to compare at least one virtual model specification (VMS) against the at least one display requirement of the display specification to determine a best match therebetween to select a virtual device model to control a display picture.

BRIEF DESCRIPTION OF THE DRAWINGS

The teachings of the present invention can be readily understood by considering the following detailed description in conjunction with the accompanying drawings, in which:

FIG. 8 depicts a decision matrix/lookup table implemented for selecting a virtual device model to use in a display picture in accordance with an embodiment of the present invention.

Figure 1:
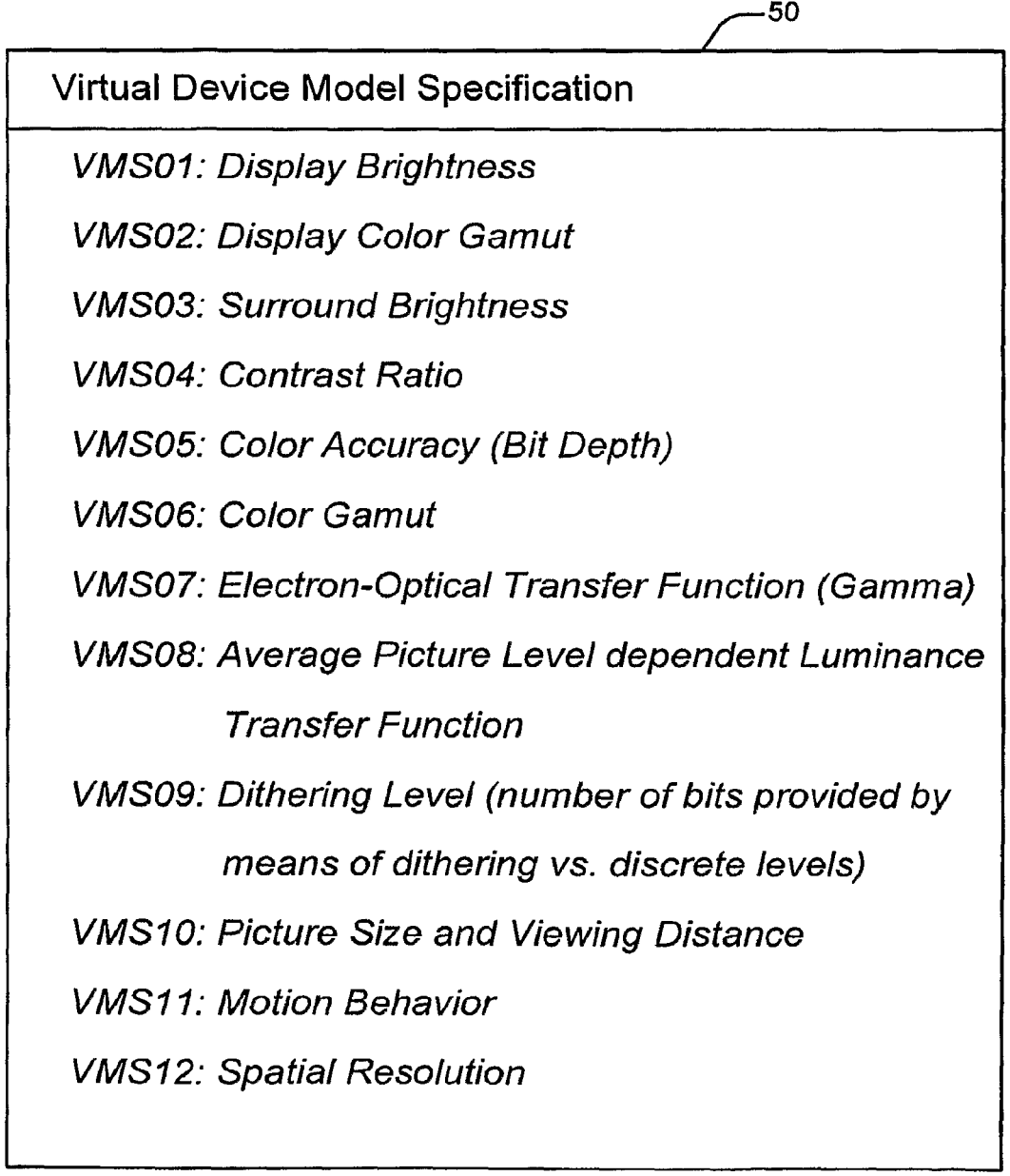
FIG. 1 depicts an illustrative virtual device model specification for a virtual model in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for providing color grading or color correction for a multiplicity of displays. Although the present invention will be described primarily within the context of color corrections for consumer displays, the specific embodiments of the present invention should not be treated as limiting the scope of the invention. It will be appreciated by those skilled in the art and informed by the teachings of the present invention that the concepts of the present invention can be advantageously applied in any display system and be used to correct picture features. For example, the concepts of the present invention can be implemented in color correction, color grading, gamma adjustment, contrast, brightness, color gamut, dynamic range, display calibration, display characterization, color management, color appearance and the like.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In accordance with various embodiments of the present invention, a method, apparatus and system for providing color grading/color correction for a multiplicity of displays employs several virtual device models to cover the usage of a plurality of different available display types. The use of virtual device models for color correction includes, among other things, a specification of display attributes or features, such as, color gamut, viewing condition, color reproduction accuracy, motion behavior, spatial behavior, display characteristic, non-linear characteristics (e.g., an average picture level dependency), etc. It should be understood that the principles described herein are applicable to post production color correction and, as well, color processing for displays.

In accordance with various embodiments of the present invention, a predictable output picture is provided that achieves a highest possible picture quality with a given display. The output picture is color corrected for the display actually used. As previously recited, due to the variety of displays on the market and being used by consumers, it is a near impossible task to produce one version of each feature for each existing individual display. As such and in accordance with various embodiments of the present invention, a combined approach can be taken, which includes action on both the content creation side as well as on the display side. This can include, in various embodiments, added diversification on the content creation side and standardization and calibration on the display side.

In addition, in various embodiments of the present invention, definitions of display groups or display classes can be employed. That is, if displays are grouped into display groups according to their display properties and behavior, new virtual device models can be created for each of these display groups. Then, the display manufacturer can calibrate the display to this new standardized model, thereby permitting an exploitation of the display quality of any display while achieving a consistent color rendering. As a consequence, and as an extension of existing virtual device models, viewing condition parameters are included in the new virtual device models. These virtual device models can include absolute viewing brightness and surround, parameters like spatial and motion behavior, or information about possible non-linear color reproduction behavior of the device (such as an average picture level dependency), among others.

FIG. 1 depicts an illustrative virtual device model specification for a virtual model in accordance with an embodiment of the present invention. The virtual device model specification 50 of FIG. 1 illustratively includes a virtual model specification (VMS) for each of a plurality of features or attributes. For example, the VMS's can include VMS01 for display brightness, VMS02 for display color gamut, VMS03 for surround brightness, VMS04 for contrast ratio, VMS05 for color accuracy (bit depth), VMS06 for color gamut, VMS07 for electrical-optical transfer function (gamma), VMS08 for average picture level dependent luminance transfer function, VMS09 for dithering level (number of bits provided by means of dithering versus discrete levels), VMS10 for picture size and viewing distance, VMS11 for motion behavior, VMS12 for spatial resolution, etc.

The device model specification 50 can be used in color correction of content, such as home video, using several virtual device models in anticipation of currently installed displays, and can be employed for use in color correction, including a specification of color gamut, viewing condition, color reproduction accuracy, motion behavior, spatial behavior and display characteristics, non linear characteristics like an average picture level dependency, etc.

In accordance with the present invention, changes to the post-production side (content creation) as well as the display side can be incorporated. On the post-production side, the purpose of color correction has evolved from a traditional process that was put in place to make the picture look better (the displayed colors needed to be modified to provide a correct look on the target presentation devices) to a process where an artistic concept can be explored and rendered. Therefore, the process can be viewed as including two individual segments.

A first segment includes colors from input media being adapted to a specification of an output media or device. A second segment includes the colors being changed to create an artistic look. In the first segment, a picture is color "corrected" to meet the physical characteristic of the output media, such as, a display described by the virtual device model targeted for ITU-R Bt.709 or other specifications. For example, contrast is changed according to the possible contrast of the output media, the opto-electrical transfer function is changed according to the specification of the picture presentation device, and the colors are changed to fit inside the color gamut of the output media. All of these parameters can be specified in the virtual device model in accordance with the present invention. While all the factors listed in FIG. 1 can be implemented, each is not specified in current specifications. In traditional color corrections (e.g., in video to video or film to film transfers), one-dimensional transformations including a manipulation of the power (gamma), gain and offset are often sufficient. In a film to video or video to film transfer, however, a one-dimensional transformation is insufficient, yet it has been the only tool at hand in, for example, traditional telecine environments. In later techniques, three-dimensional transformations could be employed.

In the second segment, even with traditional color correction methods, artists were able to change the artistic intent within certain limitations. However, there are many more possibilities for color correction given more recent changes in technology. In addition to the above identified 1-D color corrections, which include gain, offset and power, there exist corrections that involve "crosstalk", (i.e., a mix of information between color channels, Red, Green and Blue). These modification mechanisms permit changes in hue and saturation. Even more advanced modification mechanisms permit changes like brightness, hue, and saturation for a selected range of colors, leaving the other colors unchanged. In a more advanced mechanism, this manipulation can be applied to only a selected object in the picture or to the entire picture. Furthermore, an object can be tracked from picture frame to picture frame, so that the same modification is applied to a range of picture frames.

These tools are currently available to the filmmakers, and they can and do use them to apply an artistic look to the picture. For example, a scene shot in the California sunlight can be altered to simulate the lighting conditions in Alaska or a strong desert atmosphere can be created by tinting the whole scene in a yellowish tone. If the wedding dress doesn't come out white enough with the lighting used then it can be selectively whitened, and so on. This is referred to as "artistic intent".

Therefore, the filmmaker's use of color to express his or her artistic intent is provided using one reference display. As a consequence, the artistic intent and the display intent are inherently intertwined. If the content is shown on a display other than the one used for color correction, then the correct representation of the artistic intent cannot be provided.

In accordance with embodiments of the present invention, color correction is provided on one or several display devices that are representative of the displays that are actually used or will be used by, for example, consumers. This is provided, in various embodiments, by using new virtual device models, one for each group or class of displays. The model permits the actual display used to view the image product (e.g., motion picture product) to easily adapt itself to these device model parameters.

During post-production, color correction is performed for one, two, or several of these virtual device models. As an option, it is assumed that the professional display device(s) used for color correction is capable of emulating several virtual devices on one single display. In various embodiments of the present invention, the color correction can be accomplished using at least one professional direct view type of display for color correction for the different direct view display virtual device models, and one professional front projection display for color correction for different front projection virtual device models.

The color correction process of the present invention can be performed in a sequential manner or in a parallel manner. If different viewing conditions are involved, a parallel color correction is not as easily possible. Furthermore, parallel color correction means a setup with more than one display lit up at a time, which in itself would mean a distortion of the viewing condition. Thus, the sequential type of color correction is preferred, although more time consuming.

In one embodiment of the present invention, a way to make this process more effective is to use a warning tool that informs about potential differences in appearance on one or the other virtual device models and viewing conditions. In this way, the color correction process could be concentrated more on artistic intent rather than on display control.

Figure 2:
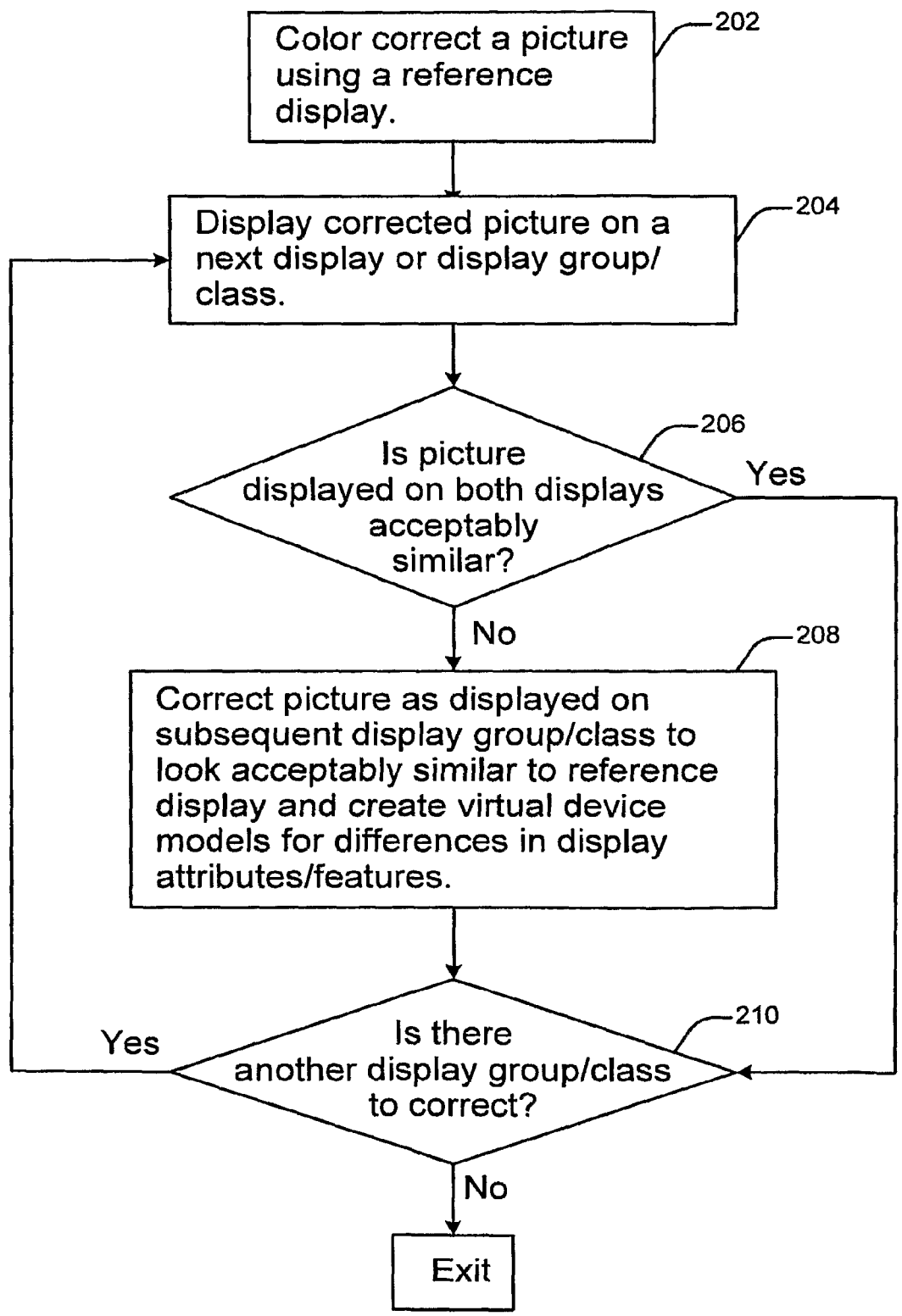
FIG. 2 depicts a flow diagram of a method for color grading for several display classes/groups of displays in a sequential manner in accordance with one embodiment of the present invention.

FIG. 2 depicts a flow diagram of a method for color grading for several display classes/groups of displays in a sequential manner in accordance with one embodiment of the present invention. The method of FIG. 2 begins in step 202, in which a picture is color corrected for a reference first display class or group, which can include, for example, a CRT or an LCD, represented by a virtual device model for CRT or a virtual device model for LCD, respectively. Alternatively, this may include a color correction of two individual displays, for example an LCD and a projection display, represented by a virtual device model for LCD and a virtual device model for the front projection, with the result that there are two video masters produced. Other groups and/or technologies are also contemplated and can be employed to provide color correction of a first display class. The primary color correction decision derived for the first class can be taken as a basis for the other display groups. The method then proceeds to step 204.

At step 204, the picture is displayed on a next display group/class for which a display of the picture is to be corrected. The method then proceeds to step 206.

At step 206, a determination is made as to whether or not the picture as displayed on the subsequent display group/class is acceptable as displayed. That is, the picture displayed on the next display group/class is examined to determine if the picture looks similar enough to the picture on the first display for which the picture was corrected, and whether artifacts like quantization, motion or other artifacts become visible. If the picture as displayed is acceptable, then the method skips to step 210. If the picture as displayed is not acceptable, then the method skips to step 208.

At step 208, a creative interaction is performed to change the look of the picture displayed on that subsequent display group/class to look acceptably similar to the picture displayed on the first reference display. That is, a correction is made for the pictured displayed on the subsequent display group/class to look acceptably similar to the picture displayed on the first reference display. As such, a virtual device model is created which corrects for the aspect(s) of the display (display attribute) which causes a difference in the display of the picture between the first reference display and the subsequent display group/class. More specifically, a virtual device model is created to compensate for the display attribute differences between the reference display and the subsequent display group/class. In one embodiment of the present invention, a virtual device model can be created for each of the display attributes of the subsequent display group/class which is different than the reference display. As such, a plurality of virtual device models can be created, each representing a display attribute and a correction needed for each display attribute to present a picture that is acceptably similar to the picture displayed on the first reference display. In one embodiment of the present invention, the creative interaction can be performed on a scene-by-scene basis, where a scene is referred to as a sequence of frames as determined by the filmmakers during the editorial process. Having created the virtual device models, subsequently on the display side, respective virtual device models can be selected for display of a picture on a display having similar display attributes to those depicted by the created virtual device models. The method then proceeds to step 210.

At step 210 it is determined if a next display group/class exists for which the display of the picture is to be corrected and virtual device models created to compensate for any differences in the display attributes between the first reference display (assuming that the professional display device (s) used for color correction is capable of emulating several virtual devices on one single display) or alternatively a reference display of a similar group/class (e.g., plasma, LCD, etc.) and the subsequent next display group/class of that type. If a next display group/class exists, the method returns to step 204. If no other display groups/classes exist, the method is then exited. At the end of the method of color correction of FIG. 2, there will be N video masters for N display groups, represented by respective virtual device models determined in step 208.

Figure 3:
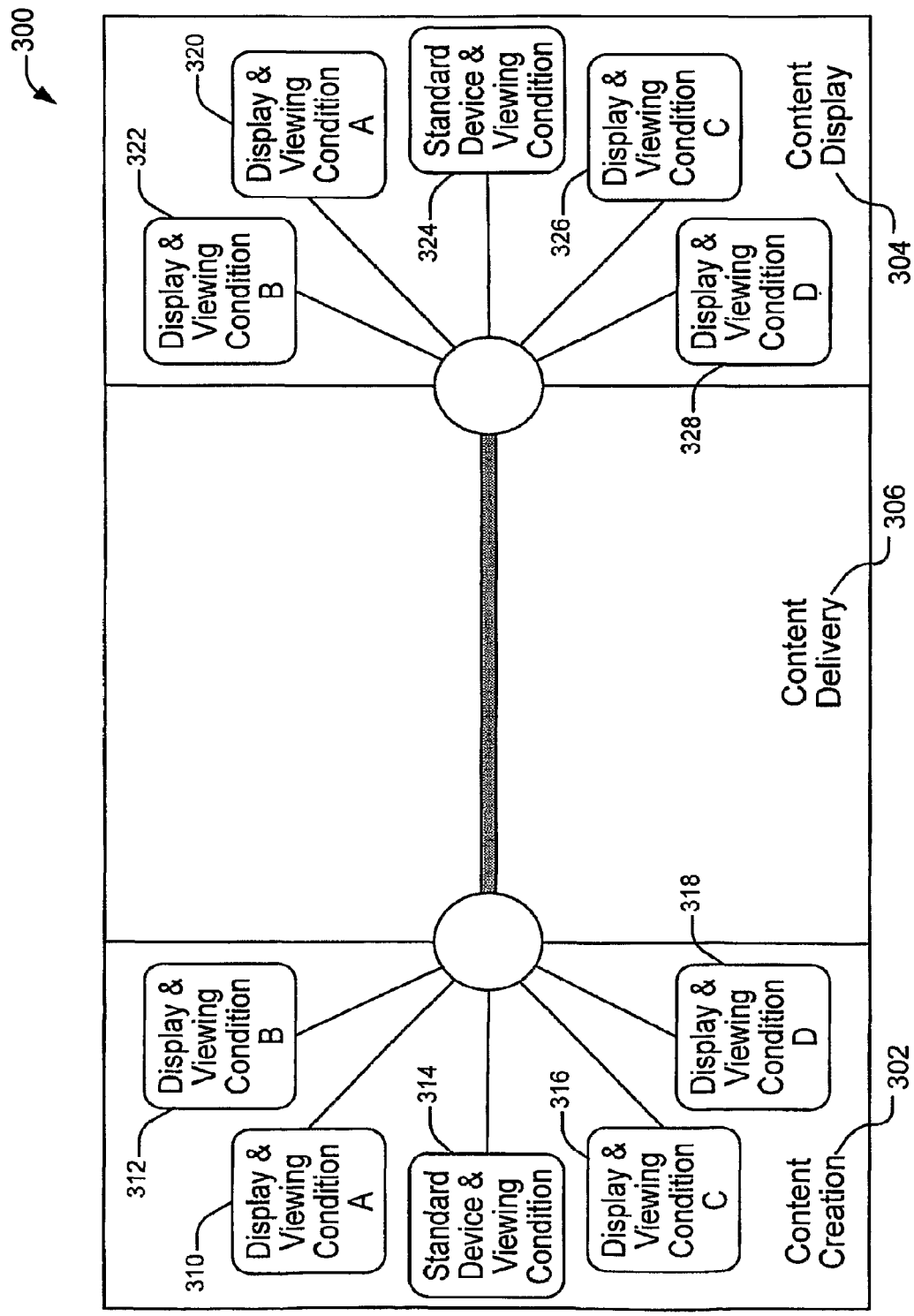
FIG. 3 depicts a block diagram of an implementation which makes virtual device models available to display classes or groups at the content creation side, on the content delivery side, and on the content display side, in accordance with one embodiment of the present invention.

FIG. 3 depicts a block diagram of an implementation of the present invention which makes virtual device models available for display classes or groups at the content creation side, available on the content delivery side, and on the content display side, in accordance with one embodiment of the present invention. In FIG. 3, on the content creation side 302, a plurality of versions and conditions are created as virtual device models 310-318. On a consumer display side 304, there are a plurality of available picture versions and conditions which include actual display specifications for display groups 322-328 on which the virtual device models 310-318 can be based or targeted. Content delivery 306 can occur by any known method (broadcast by satellite, cable, antennae, stored on media, etc.). Depending on the display actually used, one of the versions or models 310-318 is selected for rendering images on each of the displays of groups 322-328. The selection of the proper version is based on a comparison of the actual consumer display parameters and virtual device model specifications of the different versions. It is the version with the closest match between the virtual device model 310-318 and the parameters of the actual display device having a specification (one of specifications for groups 322-328), which is selected for display. It should be understood that the displays in groups 322-328 can be capable of selecting a best virtual model and then later reselect or change the model 310-318 based on changing conditions at the display. This process is illustrated in further detail with reference to FIG. 4.

The virtual device models 310-318 are preferably designed to meet present and future display specifications. In one embodiment of the present invention, an actual display to be used is calibrated to the virtual device model 310-318 that will be selected. For example, in one embodiment, the display properties are measured once during the manufacturing of the product. In an alternate embodiment of the present invention, the display properties are measured in the field, to accommodate manufacturing calibration tolerances and variations over lifetime. However, even without any specific calibration being performed in addition to the manufacturing calibration, using a new video master derived in accordance with the present invention will result in improving the picture and making the color more predictable.

Figure 4A:
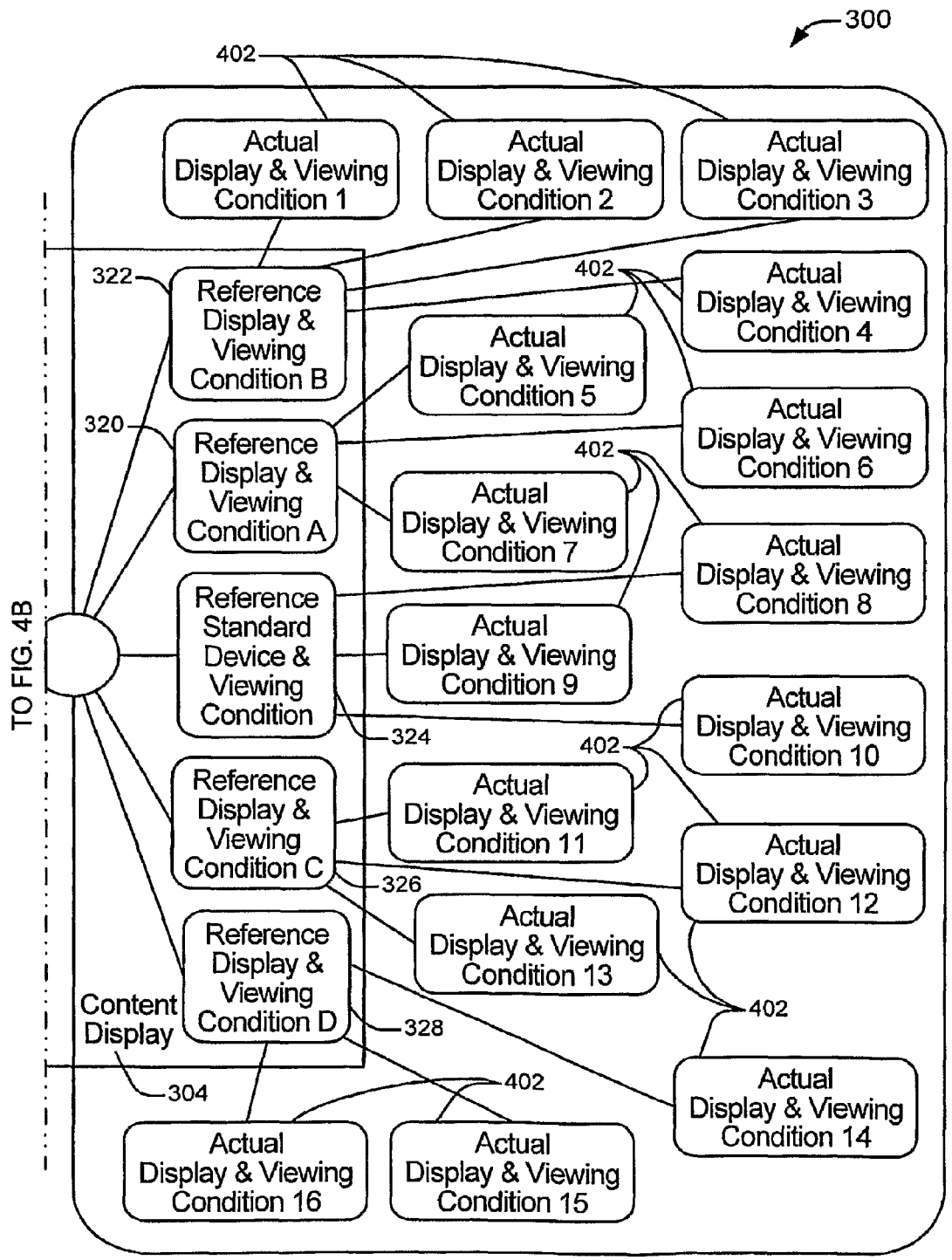
FIG. 4 depicts a block diagram of an implementation which makes virtual device models available to displays of different types and/or under different conditions in the same class or group in accordance with an alternate embodiment of the present invention.
Figure 4B:
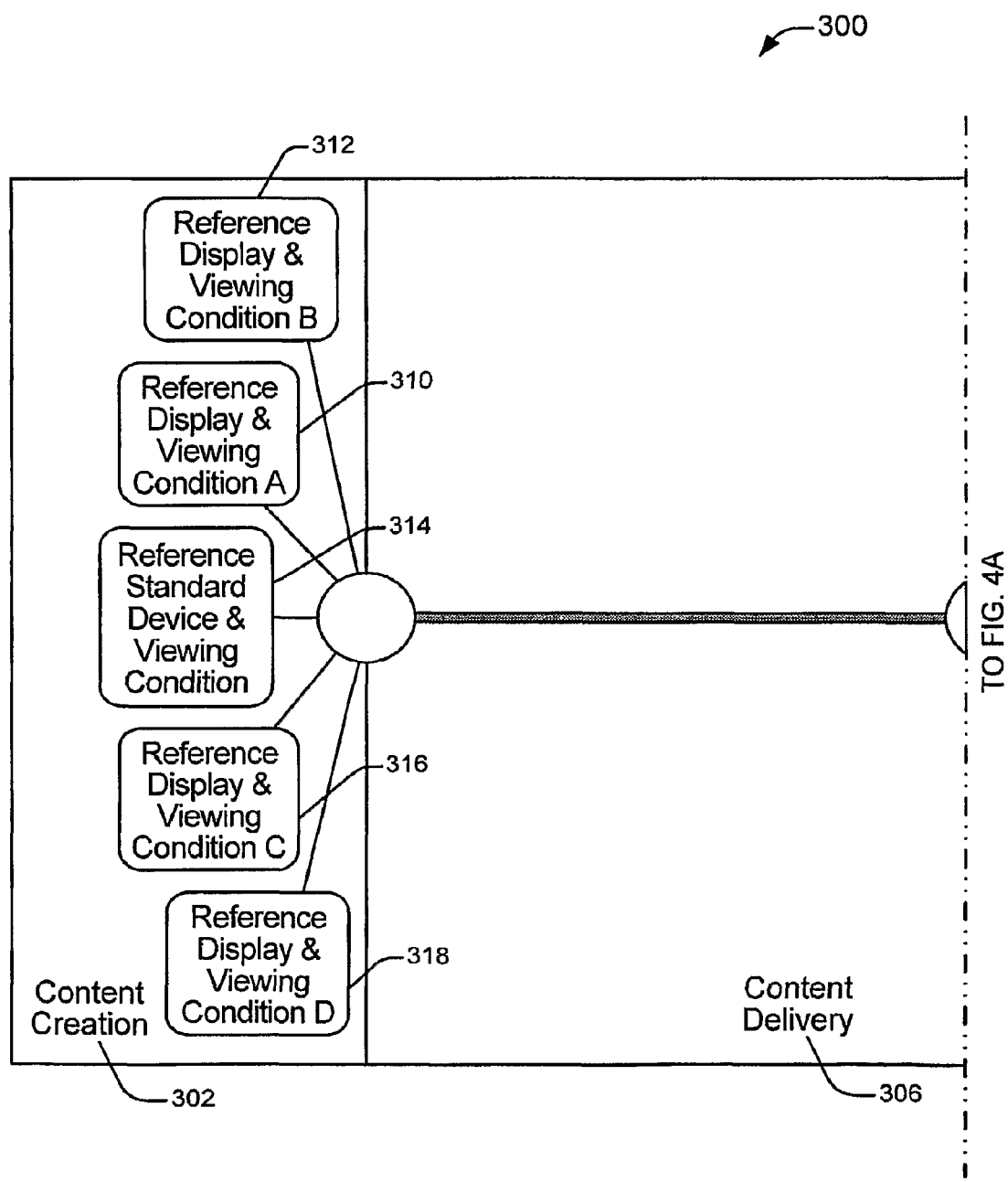

FIG. 4 depicts a block diagram of an implementation of the present invention which makes virtual device models available to displays of different types and/or under different conditions in the same class or group in accordance with an alternate embodiment of the present invention. Referring to FIG. 4, the content display side 304 is shown in greater detail having multiple displays 402 grouped in a display group 322-328. A plurality of actual displays 402 include one or more conditions or display types. For simplicity, each display 402 will be designated as having a condition from 1-12. A virtual model specification (VSM) 310-318 corresponds to a display specification group 322-328. The display specification group 322-328, in turn can satisfy a plurality of different conditions or versions of an actual display. To demonstrate this, FIG. 4 illustrates that display specification of group 322 satisfies displays 402 with conditions 1, 2, 3 and 4; display specification group 320 satisfies displays 402 with conditions 5, 6 and 7; display specification group 324, which can be a standard reference specification, satisfies displays 402 with conditions 8, 9 and 10; display specification group 326 satisfies displays 402 with conditions 11, 12 and 13; and display specification group 328 satisfies displays 402 with conditions 14, 15 and 16. While each display may not have an exact match with a virtual model, each display can select a best match for that display. In accordance with the present invention there is a plurality of ways for determining a best match. In one embodiment of the present invention, a best match can comprise a user selectable order of importance for VSM matches or VSM matches can be weighted. The content creator (302) or manufacturer can also provide recommendations as to which virtual model should be selected for a given display type.

During the color correction process, a colorist can view each display class or classes on one or more display types. As such, a practice of emulating one or several device models on one or more professional displays for proof viewing can be achieved. This provides the possibility of alerting the colorist of a problem in one or several models, and enables the colorist to remain focused on one or several virtual device models but not all at a time. In one embodiment, at a given location the color correction process is sequential, that is, the colorist views one display at a time so as to not influence the color decisions based upon ambient conditions caused by other displays.

In an alternate embodiment of the present invention, color correcting for a primary main stream display can be performed and specifications can be slightly modified for individual secondary display classes. In yet alternate embodiments, a separate specification can be created for the secondary display class if needed (e.g., the color decisions do not provide the desired effect using the primary mainstream display specification). Alternatively, several versions of, for example, a movie feature can be made and color corrected for individual virtual device models, and made available for viewing. In yet another embodiment of the present invention, perceived consistency among different display environments can be achieved by diversifying the content production process in combination with a calibration process in the display. For example, color correction decisions can be made to permit differences between different device models but stay consistent among a class of devices using a particular device model.

Figure 5A:
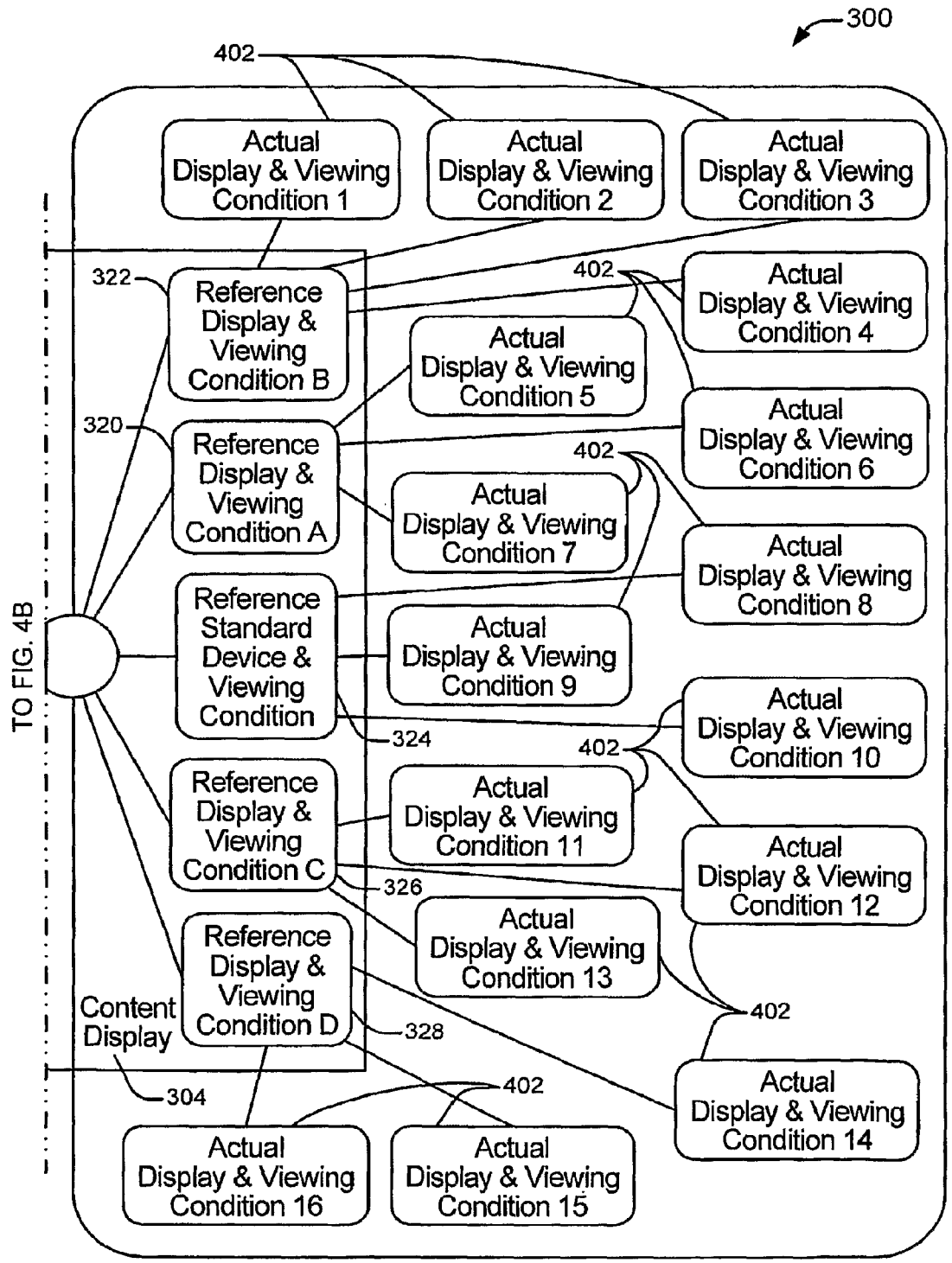
FIG. 5 depicts a block diagram of an implementation which makes a special virtual device model available to a special display or provides a special effect for a display in accordance with an alternate embodiment of the present invention.
Figure 5B:
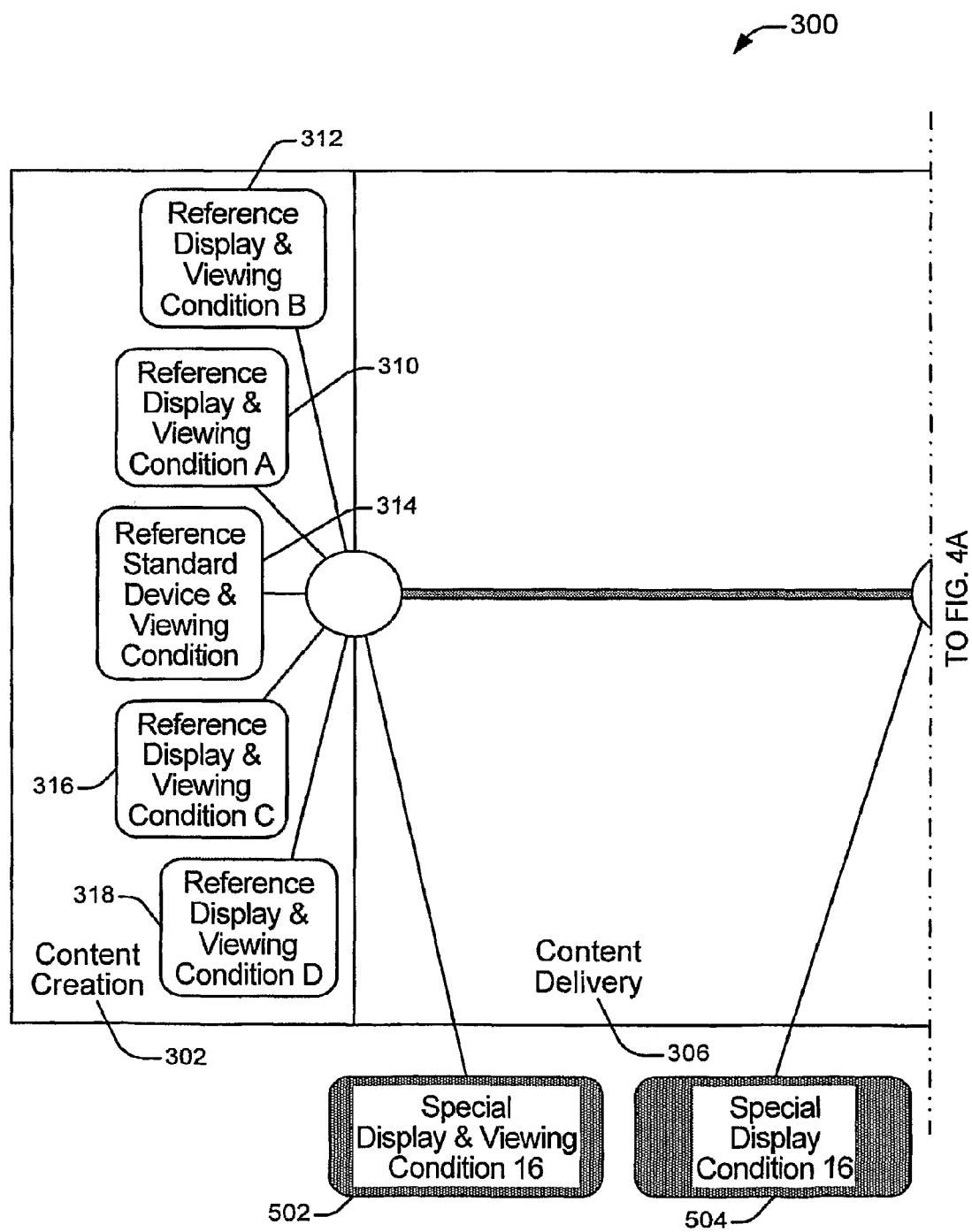

FIG. 5 depicts a block diagram of an implementation of the present invention which makes a special virtual device model available to a special display or provides a special effect for a display in accordance with an alternate embodiment of the present invention. As depicted in FIG. 5, virtual models can be updated or created for special viewing conditions. For example, a broadcast of content or a special effect may need to have specific conditions or settings to provide a desired rendered output or display effect. A special display or viewing condition virtual model 502 is generated and delivered to a particular display type 504 or a display type needing a special condition 16.

In one embodiment of the present invention, this special application uses one or more particular non-generalized displays 802 for color grading. In the course of a special promotion or other business reason, it is possible to place one specific reference consumer display in a color correction bay. The colors are then corrected for this display to create a unique and special version. The consumer using this particular display 804 and unique version of content can retrieve the information and is thereby ensured that the image on the screen is the same as the image the colorist had on his screen provided that the display 804 is calibrated on the reference screen 804 and the viewing environment is roughly equal. One example for employing this embodiment can include color correcting on a special display as a business promotion, where the display manufacturer participates in the cost of content production.

Figure 6:
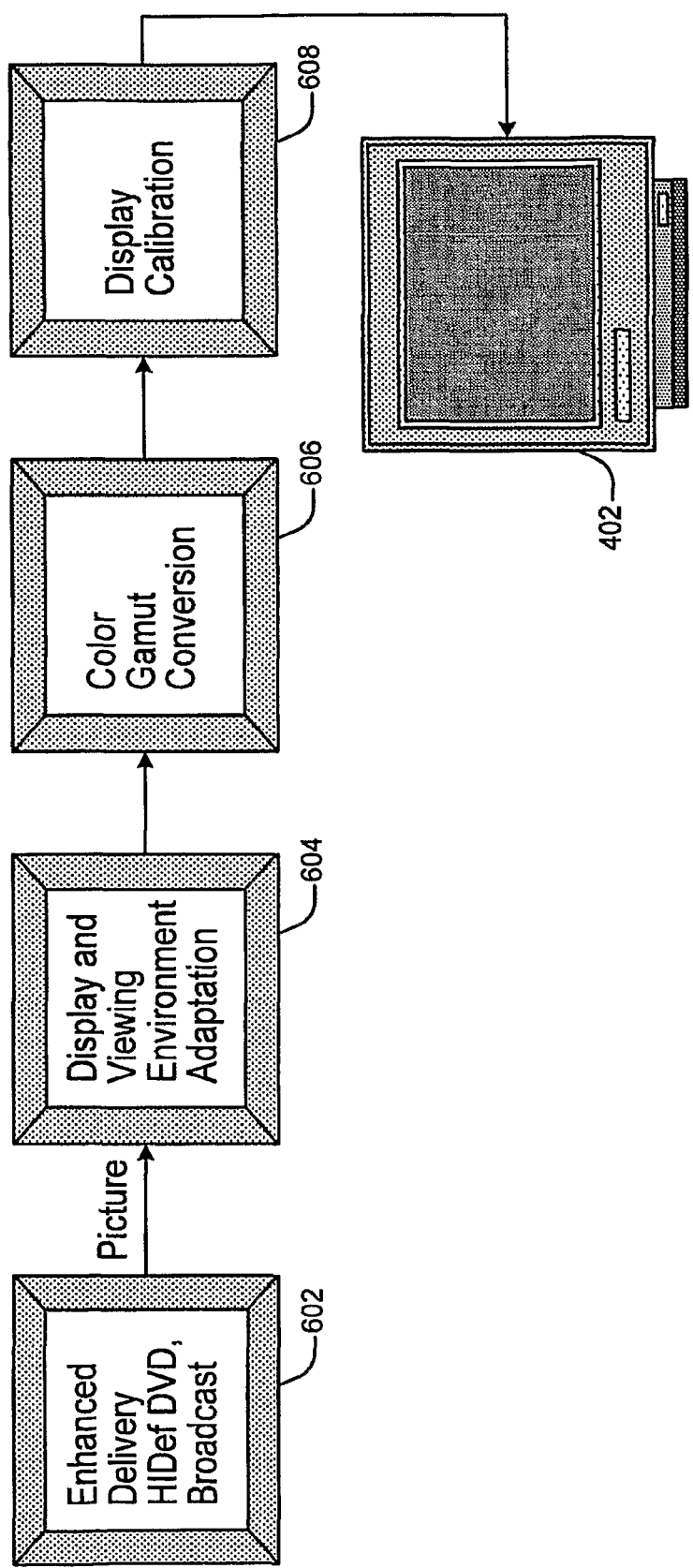
FIG. 6 depicts a block diagram of a calibration method for generating a virtual device model in accordance with an embodiment of the present invention.

FIG. 6 depicts a block diagram of a calibration method for generating a virtual device model in accordance with an embodiment of the present invention. Referring to FIG. 6, a display calibration process is illustratively depicted for generating virtual device models. In block 602 of FIG. 6, content is provided. Content can include enhanced content delivery such as a high definition (HD) broadcast or the like. Content is adapted to an actual viewing condition by a display and viewing environment adaptation in block 604. For the viewing condition, the parameters can include, for example, the actual display brightness, the display white point, the surround brightness, the display size, the viewing distance, etc. The adaptation can include, among other candidates, a known color appearance model (e.g., CIECAM02). The color appearance model can be compared to a plurality of candidate virtual model settings to determine a closest match to the model. For other display adaptations, such as motion behavior and spatial resolution, methods for depicting accurate motion and spatial resolution can be employed where criteria for accurate motion is set forth and compared to rendering from candidate virtual models. Picture sharpness circuitry can be included to test for the spatial resolution or other features.

In block 606, a color gamut conversion is performed, where the source colors are predictably mapped to the display colors, for example, by hue preserving lightness mapping algorithms. In one embodiment of the present invention, the parameters are the color gamut of the virtual device (see FIG. 1), and the color gamut of the display device. In block 608, actual calibration is performed, where an accurate tracking of all colors is ensured. In one embodiment of the present invention, this is performed by using a measurement utility that collects data regarding the differences of the actual display to the virtual device model used. This data is used to calculate a mapping of the data provided for the virtual device to the actual device. That is, the calibration of the display is used to generate a virtual device model for that particular display type under noted environmental conditions. These processes can also be combined into one or more processes or process steps.

Figure 7:
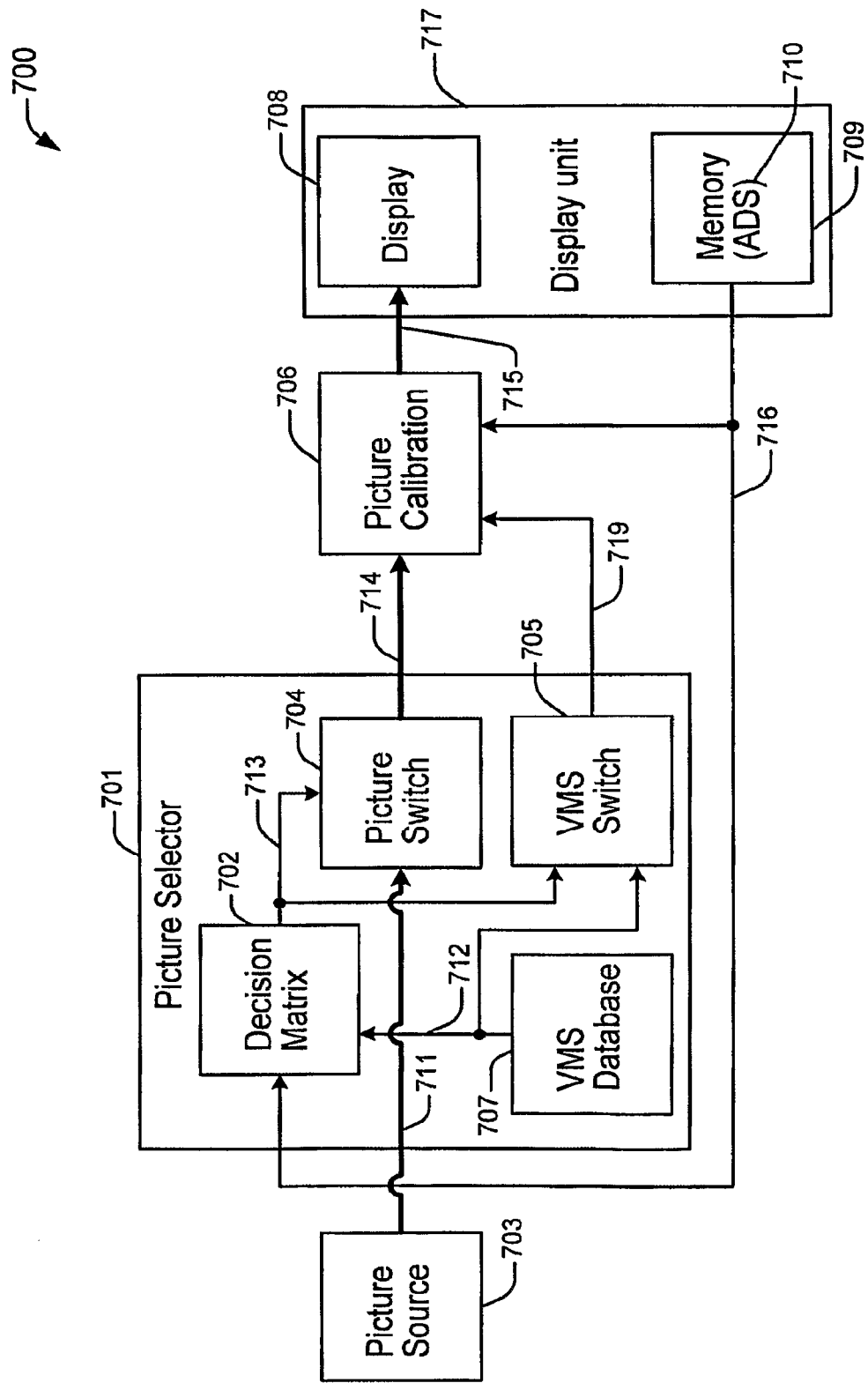
FIG. 7 depicts a high level block diagram of a system for virtual device model selection in accordance with actual device specifications in accordance with an embodiment of the present invention.

FIG. 7 depicts a high level block diagram of a system for virtual device model selection in accordance with actual device specifications in accordance with an embodiment of the present invention. Referring to FIG. 7, the virtual device model selection process makes the decision about which version of the picture data is chosen, and is to be made on the basis of a comparison of the actual display specification (ADS) parameters with the virtual device model (VM) parameters. For example the system 700 of FIG. 7 illustratively includes a picture selector 701. The picture selector 701 of FIG. 7 can be a stand-alone device or can be integrated into a display unit 717. In an alternate embodiment of the present invention, the picture selector 701 can also be integrated into a picture source device 703. A picture source device 703 provides picture data 711 for all virtual device models. This means that if a number, n, of VM's are to be supported, then n sets of picture data are to be provided. A picture switch 704 then selects one picture data set 714 out of the set of n picture data sets for display or further processing. A display unit 707 includes an actual display 708 for picture representation, and a database or memory 709 that includes an actual device specification (ADS) 709. The ADS 710 signals the actual device specification parameters 716 to a decision matrix 702 and to an optional picture calibration block 706. This picture calibration block 706 can include software or circuitry that adapts the picture data 714 to represent the virtual device model (VM). The virtual device model is stored in a VMS database 707 and the appropriate model is switched to by VMS switch 705. The model is transferred using signal 719 and calibrated in the picture calibration block 706. Picture data 715 representing the correct data based on the correct device model in accordance with the ADS signal 716 is output to the display 708.

The picture switch 704 selects the picture data 714 from the set of picture data 711 based on a decision which is signaled by signal 713. The same signal 713 selects a particular set of VMSs or models using VMS switch 705. The VMSs are transmitted via signal 719 for use in downstream picture calibration 706. The block 705 is optional and depends on the existence of block 706. The n sets of VMS signals 712 are further provided to the decision matrix 702. The functionality of decision matrix 702 is described below with reference to FIG. 8. The decision matrix 702 can include a look-up table, state machine, or other suitable device or memory.

FIG. 8 depicts a decision matrix/lookup table implemented for selecting a virtual device model to use in a display picture in accordance with an embodiment of the present invention. For example, FIG. 1 describes an example virtual device model specification (VMS) with 12 parameters. Each parameter from the virtual device model specification VMS01 through VMS12, is compared with the corresponding actual device parameters following a decision matrix as depicted in FIG. 8.

Referring to FIG. 8 and with continued reference to FIG. 7, a decision matrix 702 is employed to select a best virtual model to use to provide the best or most accurate picture. In one embodiment of the present invention, this is done for all given virtual device models (VM01-VM12 in this example). Data is provided by signal 712 for entry of virtual device models (VM). Each comparison between a VMS parameter from database 707 and an actual device parameter from ADS 710 receives a score between, e.g., a floating point number between 0 and 1.0 (in this example, 0 represents a perfect match and 1.0 represents no match at all). This score is then entered into the scores section 802 of the table. Then, a weight distribution is specified, for example, in a second row 804 of the matrix 702. These weights W01-W12 determine the significance of each individual parameter in the parameters list. These weights can be selected to sum up to 1.0. The weights W01-W12 can be applied in a plurality of different ways. For example, the weights can be used to optimize the selection process by assigning weights to the individual Virtual Device Model Specification parameters according to their importance. The weights can also be assigned values as a way of enhancing predictability by standardizing the virtual device model specifications with the assigned weights.

For each individual device model (ADS 710), the accumulated scores, multiplied by the corresponding weight, result in a value between 0 and 1 after a division by the number of scores in the model (e.g., N parameters or N_Param). The virtual device model (from the VMS database 707) of choice is the one with the lowest score. It is anticipated that in general there will be a clear distinction between the VM with the highest score and the others. However, if two VMs score close to one another a tiebreaker method can be used.

An example is presented to illustrative aspects of various embodiments of the present invention. Three virtual device models with three virtual device model specification parameters are used to simplify the example. The virtual device models and specification parameters are as follows:

Display Surround {Dark, Dim, Average}, converted to numbers between 0 and 1 results in {0, 0.5, 1) for {Dark, Dim, Average}

Display Contrast={100:1, 500:1, 1000:1, 2000:1}, converted to numbers between 0 and 1 results in {0.1, 0.5, 0.7, 0.}.

Display Gamma={2.0, 2.4, 2.8}, converted to numbers between 0 and 1, this results in {0.3, 0.5, 0.7}.

In this example:

The first Virtual Device Model (VM) has the following Device Specification (including ambient specification):

Display Surround: Dark (VMS1_1=0)

Display Contrast: 2000:1 (VMS1_2=0.9)

Display Gamma: 2.8 (VMS1_3=0.7).

The second Virtual Device Model (VM) has the following Device Specification (including ambient specification):

Display Surround: Average (VMS2_1=1)

Display Contrast: 1000:1 (VMS2_2=0.7)

Display Gamma: 2.4 (VMS2_3=0.5).

The third Virtual Device Model (VM) has the following Device Specification (including ambient specification):

Display Surround: Dim (VMS3_1=0.5)

Display Contrast: 500:1 (VMS3_2=0.5)

Display Gamma: 2.4 (VMS3_3=0.5).

The weighting can be decided to be W1=0.6 for VMS0 (Display Surround), W2=0.4 for VMS 1 (Display Contrast), and W3=0.2 for VMS2 (Display Gamma). The display actually used in this case is a DLP projector, sitting in a typical dim viewing environment with the following Actual Device Specification (ADS) Parameters:

Display Surround: Dim (ADS1=0.5)

Display Contrast: 1000:1 (ADS2=0.7)

Display Gamma: 2.8 (ADS3=0.7).

With N_Param=3, the scores would be calculated using the following equation:

$$\text{Score VM1}=[abs(VMS1\_1-ADS1)*W1+abs(VMS1\_2-ADS2)*W2+abs(VMS1\_3-ADS3)]/N\_Param \quad (Eq. 1)$$

$$\text{Score VM2}=[abs(VMS2\_1-ADS1)*W1+abs(VMS2\_2-ADS2)*W2+abs(VMS2\_3-ADS3)]/N\_Param \quad (Eq. 2)$$

$$\text{Score VM3}=[abs(VMS3\_1-ADS1)*W1+abs(VMS\_2-ADS2)*W2+abs(VMS3\_3-ADS3)]/N\_Param \quad (Eq. 3)$$

In the equations above, the abs function is the absolute value function. The scores in this example would be: ScoreVM1=0.17; ScoreVM2=0.12; and ScoreVM3=0.04. As described above, N_Param denotes the number of parameters and thus the number of scores in the model. Although none of the VM's match the ADS (Actual device specification) completely, there is a clear decision for the third virtual device model since ScoreVM3=0.04 is the lowest (best) score.

Figure 9:
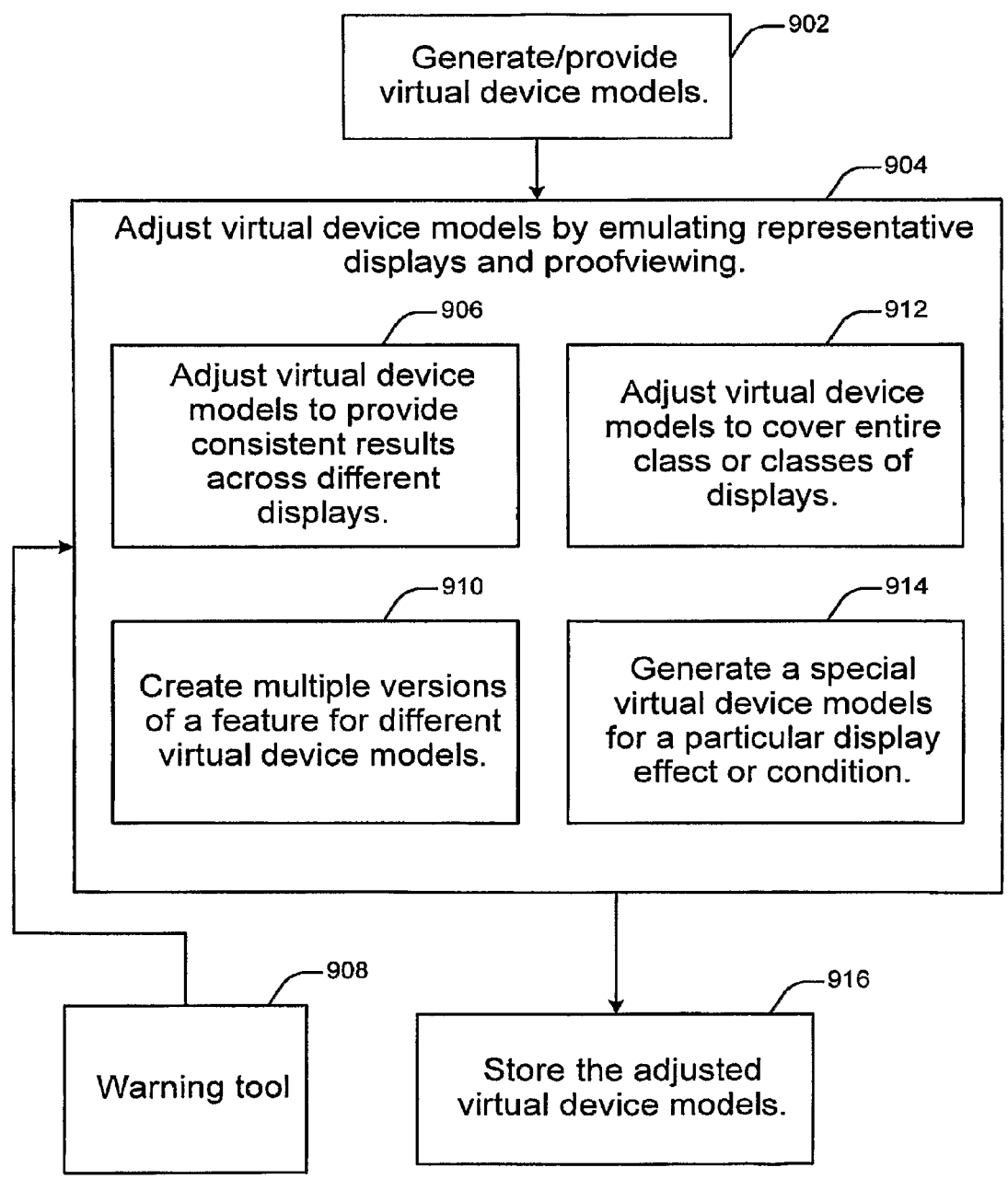
FIG. 9 depicts a flow diagram of a color correction method for generating/modifying virtual device models in accordance with one embodiment of the present invention.

FIG. 9 depicts a flow diagram of a color correction method for generating/modifying virtual device models in accordance with one embodiment of the present invention. Such corrections or modifications to content can include gain, offset and power but can also include "crosstalk" (i.e., a mix of information between color channels Red, Green and Blue, and others). The modification process can include changes in hue and saturation. Even more advanced modification processes of the present invention can include further changes such as brightness, hue, and saturation for a selected range of colors, leaving the other colors unchanged. In alternate embodiments of the present invention, more advanced modification processes can be applied to only a selected object in the picture or to the entire picture. Furthermore, an object can be tracked from picture frame to picture frame, so that the same modification is applied to a range of picture frames.

A filmmaker's use of color to express artistic intent may use one or more display devices that are representative of the displays that are actually used or will be used by consumers. To implement this, virtual device models (or virtual model specifications (VMS)), for a display, group of displays or class of displays, can be generated and employed in accordance with various embodiments of the present invention. The method of FIG. 9 begins at step 902, in which a display or a class of displays on which content is to be displayed are represented by generating/providing at least one virtual device model for color correction. These models can be provided by the display manufacturer, by the content owner or generated at the time of editing of content (e.g., movie or feature). In accordance with various embodiments of the present invention, the virtual model specifications (VMS) can include at least one of the display attribute including: display brightness, display color gamut, surround brightness, contrast ratio, color accuracy, color gamut, electrical-optical transfer function (gamma), average picture level dependent luminance transfer function, dithering level, picture size and viewing distance, motion behavior, spatial resolution, hue, saturation, as well as other display properties. The method then proceeds to step 904.

At step 904, during post production, color correction is performed for one, two, or several of these virtual device models. This includes adjusting at least one virtual device model for color correction for the display or the class of displays by emulating representative displays for proof viewing of one of a display effect and a color decision. The adjustment of the models using the color correction process can be performed in a sequential manner or in a parallel manner. If different viewing conditions are involved, a parallel color correction is not as easily possible. Furthermore, parallel color correction requires a setup with more than one display lit up at a time, which in itself would mean a distortion of the viewing condition. As such, in one embodiment of the present invention the sequential type of color correction is preferred, although more time consuming. The method then proceeds to step 906.

At step 906, an adjusting step can include adjusting the at least one virtual device model to provide one of the display effect and color decision consistently on a plurality of display types and conditions. It is assumed that the professional display device(s) used for color correction is capable of emulating several virtual devices on one single display. In one embodiment of the present invention, the color correction can be accomplished using at least one professional direct view type of display for color correction of the different direct view display virtual device models, and one professional front projection display for color correction of different front projection virtual device models. The method then proceeds to step 908.

At step 908, a warning or alert tool can be employed to check differences between images rendered on one display type versus another display type. In one embodiment of the present invention, the warning tool is implemented in software and is used to detect and report potential differences in appearance on one or the other virtual device models and viewing conditions. As such, the color correction process could be concentrated more on artistic intent rather than on display control. A colorist can employ the warning tool to make more accurate color decisions. By implementing the warning tool to check differences between images rendered on a first representative display type versus a second reference display type, consistency across a class of displays can be achieved. In addition, color decisions can be enabled based on a subset of virtual device models if several display types or classes respond to a given change in the same manner. The colorist can thereby focus on color correction for a limited set of parameters to make color decisions. The method then proceeds to step 910.

At step 910, several versions of a movie or other content can be made, and each version can be color corrected in accordance with individual virtual device models. As such and in accordance with the present invention, a plurality of virtual model specifications can be made to provide support for each display device (virtual device model). The method then proceeds to step 912.

At step 912, adjusting the virtual device models to cover a plurality of display types and conditions can be performed. More specifically, in step 912, the VMS is specified or adjusted to provide coverage of an entire class or group of displays. The VMS can then be checked to determine if the output works for the members of the class of displays by displaying a specific reference picture on each of the displays. The method can then optionally proceed to step 914 or proceed directly to step 916.

Optionally, at step 914, a special virtual device model can be generated to cover a special display condition and provide a given effect/color condition on a display. The method then proceeds to step 916.

At step 916, the virtual device models are stored in accordance with display effects or color decisions made for artistic intent or other reasons. New virtual model specifications are created and stored for a given feature or as a default setting for a display type. It is advantageous to make sure that the device model specifications provide consistency of the effect or color change across the entire class of displays.

Subsequently, on a display side, created virtual device models having similar attributes to a desired display or display group/class can be used to correct the display attributes of the desired display such that a picture to be displayed on the desired display is correctly represented and displayed on that desired display.

Having described preferred embodiments for a method, apparatus and system for providing color grading or color correction for displays (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A system for processing picture data, comprising:
a picture source device for providing a plurality of picture data;
a display device including a display specification, the display specification including at least one display requirement; and wherein
the display device further comprising:
a memory configured to store a plurality of virtual device models, each of the virtual device models including at least one parameter for specifying at least one display feature of the display device;
a picture selector configured to select one of the stored virtual device models to control a display picture provided by the display device based on a comparison between the stored virtual device models and the display specification of the display device, and the picture selector is further configured to select one of the plurality of picture data based on the selected one of the stored virtual device models; and
a picture calibration component configured to adapt the selected one of the plurality of picture data selected by said picture selector to be provided by the same display device based on the selected one of the stored virtual device models.

2. The system as recited in claim 1, wherein the at least one parameter specifies at least one of: display brightness, display color gamut, surround brightness, contrast ratio, color accuracy, color gamut, electrical-optical transfer function (gamma), average picture level dependent luminance transfer function, dithering level, picture size and viewing distance, motion behavior, and spatial resolution.

3. The system as recited in claim 1, wherein the picture selector includes a decision matrix configured to score each display feature to each display requirement.

4. The system as recited in claim 3, wherein the decision matrix includes weights to provide a level of importance for each display requirement.

5. The system as recited in claim 1, wherein each of the plurality of virtual device models is configured to cover a plurality of display conditions.

6. The system as recited in claim 1, further comprising a special virtual device model configured to cover a selected display to provide a given consistency on the display.

7. A method performed by a display device, comprising:
receiving, by the display device, virtual device models, each of the virtual device models corresponding to a different display class and including at least one parameter for specifying at least one display feature; said display class having different physical attributes such that picture data will appear differently on each of them;
comparing, by the display device, the virtual device models to display requirements for a particular display of the display device to select a best virtual device model based on a score; said score determined based on supported picture data information; and
rendering, by the display device, a display picture on the same particular display in accordance with the best virtual device model based on the comparing.

8. The method as recited in claim 7, wherein the comparing includes generating a decision matrix to determine the score.

9. The method as recited in claim 8, wherein the generating includes weighting features of the display requirements to provide a weighted score.

10. The method as recited in claim 7, further comprising generating a plurality of virtual device models by calibrating a plurality of display types under a plurality of conditions.

11. The method as recited in claim 7, further comprising generating the virtual device models to cover a plurality of display types and conditions.

12. The method as recited in claim 7, further comprising generating one virtual device model to cover a plurality of display types and conditions.

13. The method as recited in claim 7, further comprising generating a special virtual device model to cover a special display condition and provide a given effect on a display.

14. A display unit for processing a plurality of picture data, comprising:
a display including a display specification including at least one display requirement;
a picture selector for obtaining the plurality of picture data and operative to access a plurality of different virtual device models, each of the virtual device models including at least one parameter for specifying at least one display feature, and wherein the picture selector is configured to select one of the virtual device models to control a display picture provided by the display based on a comparison between the virtual device models and the display specification of the display, and the picture selector is further configured to select one of the plurality of the picture data based on the selected one of the virtual device models; and
a picture calibration component configured to adapt the selected one of the plurality of picture data selected by the picture selector to be displayed on the same display based on the selected virtual device model.

15. The display unit as recited in claim 14, wherein the display specification includes requirements for at least one of: display brightness, display color gamut, surround brightness, contrast ratio, color accuracy, color gamut, electrical-optical transfer function (gamma), average picture level dependent luminance transfer function, dithering level, picture size and viewing distance, motion behavior, and spatial resolution.

16. The display unit as recited in claim 15, wherein the picture selector includes a decision matrix configured to score each display feature of each virtual device model to each display requirement of the display.

17. The display unit as recited in claim 16, wherein the decision matrix includes weights to provide a level of importance for each display requirement.

18. The display unit as recited in claim 14, wherein each virtual device model is configured to cover a plurality of display types and conditions.

\* \* \* \* \*